United States Patent
Uzumaki et al.

(10) Patent No.: US 6,809,893 B2
(45) Date of Patent: Oct. 26, 2004

(54) INFORMATION REFRESH METHOD, STORAGE SYSTEM AND STORAGE MEDIUM THEREOF

(75) Inventors: Takuya Uzumaki, Kawasaki (JP); Kazumasa Shimoda, Kawasaki (JP); Hiroto Takeshita, Kawasaki (JP); Atsushi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 09/770,988

(22) Filed: Jan. 26, 2001

(65) Prior Publication Data

US 2001/0010603 A1 Aug. 2, 2001

(30) Foreign Application Priority Data

Jan. 28, 2000 (JP) .......................................... 2000-020845

(51) Int. Cl.⁷ .............................. G11B 27/36; G11B 5/09
(52) U.S. Cl. ............................................. 360/31; 360/53
(58) Field of Search ................ 360/31, 53; G11B 5/09, G11B 27/36, 5/00, 5/02, 20/18

(56) References Cited

U.S. PATENT DOCUMENTS

| 6,429,984 B1 | * | 8/2002 | Alex | 360/31 |
| 6,490,111 B1 | * | 12/2002 | Sacks | 360/53 |
| 2001/0030895 A1 | * | 10/2001 | Li | 365/200 |

FOREIGN PATENT DOCUMENTS

| JP | 10-255202 | | 9/1998 | |
| JP | 10-255209 | | 9/1998 | |
| JP | 2002133769 A | * | 5/2002 | ........... G11B/20/10 |

* cited by examiner

Primary Examiner—David Hudspeth
Assistant Examiner—Dan I Davidson
(74) Attorney, Agent, or Firm—Greer, Burns & Crain, Ltd.

(57) ABSTRACT

A storage system has a storage medium, a head, and a control unit for carrying out refresh processing. A refresh operation extracts data that needs to be refreshed by measuring the read-out output level of target data. Then, data requiring refresh is re-recorded to the storage medium by the head. Because an actual data level is observed, it is possible to accurately detect refresh target data, and because there is no need for a reference area, it is possible to prevent a reduction in storage capacity.

6 Claims, 13 Drawing Sheets

```
DETECT A CANDIDATE DATA TO BE REFRESHED
(LAPSE TIME AFTER RECORDING)
              |
              V
JUDGE WHETHER OR NOT REFRESH IS
NECESSARY (BY OUTPUT OF READ HEAD)
              |
              V
DETECT SIMULTANEOUS RECORDED DATA WITH
REFRESHED DATA
              |
              V
        RE-RECORD
```

INFORMATION REFRESH METHOD, STORAGE SYSTEM AND STORAGE MEDIUM THEREOF

BACKGROUND OF THE INVENTION

1. Field of the Invention

The present invention relates to an information refresh method, storage system and storage medium thereof for re-recording information on a storage medium so as to prevent the disappearance of information on a storage medium, and more particularly, to an information refresh method, storage system and storage medium for re-recording this information by detecting that information, which needs to be refreshed.

2. Description of the Related Art

Remarkable improvements have been made in magnetic record density in recent years. For example, the recording density for hard disk devices, which are used as storage devices in computers and so forth, is doubling annually. In this magnetic recording, to improve write and read characteristics (signal-to-noise ratio (S/N)) even when writing and reading high-density information, the size of the crystal grain of the medium's data recording film is becoming smaller.

For example, current recording density is 10-gigabits (Gbits) per square inch, but when this recording density becomes around 30 Gbits per square inch, the size of the crystal grain will become extremely small. When this happens, there will occur what is called thermal decay of demagnetization, by which magnetic information is lost due to thermal fluctuation.

For a longitudinal magnetic recording system in particular, since "1", "0" information is indicated by the direction of magnetization, when the direction of magnetization changes, recorded data is disappeared. The temperature energy of the magnetic material, and the fact that the inverse magnetic field of the magnetic material itself becomes large when magnetic recording density becomes high density are pointed to as causes of this disappearance of data. To prevent the disappearance of data due to this thermal fluctuation, the re-writing of data, what is called refresh control, becomes necessary.

The capacity of a magnetic disk in a hard disk device is extremely large. For this reason, it takes a long time to re-write all of the information stored thereon. Thus, there is a proposal to make refresh processing time shorter. That is, a method for detecting from among the information on a disk that information which should be refreshed, and refreshing the detected information. In prior, the following methods have been proposed as this method.

(1) First method is a method for recording reference data on a recording medium separately from ordinary data, and making a determination as to whether or not refresh is needed for the corresponding data in accordance with the playback level value of this reference data (For example, Japanese Patent Laid-open No. 10-255202).

(2) Recorded data deteriorates together with the passage of time after writing. Thus, another method is a method for determining whether or not refresh needs by measuring the elapsed time after recording. Or, the other method is a method for performing refresh when a change of temperature of the medium is detected, and the change is large (For example, Japanese Patent Laid-open No. 10-255209).

However, conventional technology has the following problems.

(1) The problem with the first conventional technology is that because the playback level of reference data is detected, it is not possible to determine the actual deterioration of the data. That is, it is known that the thermal fluctuation phenomenon differs in accordance with the recording pattern, but it is not possible to accurately detect data that should be refreshed by detecting the playback level of reference data.

(2) Further, the first conventional technology is also problematic in that an area on which to record reference data must be provided on a recording medium, causing recording area to be wasted.

(3) As for the second conventional technology, since the elapsed time for each data is detected, refresh can be realized relatively easily, but the problem is that because elapsed time indirectly indicates the deterioration of data, in actuality, a determination is made that refresh must be performed even on data that does not need to be refreshed. That is, because re-recording is performed for data that does not require refresh, there is a great likelihood that huge amounts of wasteful processing will take place.

(4) Further, in the second conventional technology, it is also disclosed that data to be refreshed is further clarified by measuring temperature, but the problem is that temperature also indirectly indicates data deterioration, and, in the end, in actuality a determination is made that refresh must be performed even on data that does not need to be refreshed.

(5) Furthermore, in the case of a magnetic disk, because servo information is also magnetically recorded together with data information, the signal quality of the servo information is similarly deteriorated by thermal fluctuations. However, the problem is that when servo information is re-recorded, because this servo information cannot be read, head positioning is not possible, making it substantially impossible to refresh servo information.

(6) Further, for the indirect detection methods of the first and second conventional technologies, the problem is that it is impossible to detect the deterioration of the quality of servo information.

(7) Furthermore, for a high-density medium that requires refresh frequently, the problem is that access is limited by refresh, deteriorating the performance of the storage medium.

SUMMARY OF THE INVENTION

An object of the present invention is to provide an information refresh method, storage system and storage medium for accurately determining whether or not information should be refreshed.

Another object of the present invention is to provide an information refresh method, storage system and storage medium for detecting information to be refreshed from actual information.

Yet another object of the present invention is to provide an information refresh method, storage system and storage medium for preventing the wasting of storage area of a storage medium, and for detecting information to be refreshed.

Yet another object of the present invention is to provide an information refresh method, storage system and storage medium for detecting information to be refreshed in accordance with the characteristics of each storage medium.

Yet another object of the present invention is to provide an information refresh method, storage system and storage medium for refreshing servo information via the storage device itself.

Yet another object of the present invention is to provide an information refresh method, storage system and storage medium for accurately determining whether servo information should be refreshed.

Yet another object of the present invention is to provide an information refresh method, storage system and storage medium for not limiting read access even when refresh is performed.

To achieve these objects, an information refresh method of the present invention comprises the step of measuring from head output the playback output level of targeted information of the above-mentioned storage medium, and determining whether or not refresh is necessary, and the step of re-recording the above-mentioned information requiring refresh to the above-mentioned storage medium via the above-mentioned head.

In an aspect of an embodiment of the present invention, the deterioration of data is directly detected by monitoring the playback output level of targeted information. For this reason, it is possible to accurately detect whether or not information should be refreshed, enabling the prevention of useless refresh. Further, because detection is direct, the deterioration of servo information can also be detected, and moreover, there is no need to provide a reference data area on a storage medium, making it possible to prevent a reduction of storage capacity.

In an information refresh method of another aspect of the present invention, the above-mentioned determination step comprises a step for detecting candidate data to be refreshed by measuring the elapsed time from the writing of each data, and a step for determining whether or not to perform refresh by measuring the playback output level of the abovementioned candidate data via the output of the abovementioned head.

In this aspect of the present invention, refresh candidate data is selected based on the elapsed time of data, and data to be refreshed is selected based on the playback output level of the selected candidate data. However, checking the playback output levels of all the data is troublesome and time consuming. Thus, a certain amount of screening is done in advance by providing prior to checking the playback output level a method for selecting refresh candidate data based on the elapsed time of data, which can be performed via a relatively simple process.

Thus, refresh data can be accurately obtained, and, in addition, processing time can also be prevented from taking a long time. Further, since actual data is checked, it is possible to prevent the waste of storage area.

In an information refresh method of another aspect of the present invention, the above-mentioned determination step comprises a step for measuring a first output level of the above-mentioned candidate data via the above-mentioned head, a step for reading out and measuring a second output level of the above-mentioned candidate data after writing the abovementioned candidate data to the above-mentioned storage medium, and a step for determining whether or not the above-mentioned refresh is necessary based on the ratio of the above-mentioned first and second output levels.

In this aspect, to detect the deterioration of data based on data playback output levels, a change in relative levels is checked using a ratio between a readout level and a readout level at rewrite. Thus, level changes can be accurately checked without relying on head or storage medium characteristics.

In a further aspect of the information refresh method of the present invention, the above-mentioned determination step comprises a step for determining whether or not refresh is necessary based on the amplitude of servo information of a relatively long recording wavelength, and the amplitude of servo information of a relatively short recording wavelength from among the servo information, which the above-mentioned head read out.

In this aspect, to make a determination as to whether or not servo information should be refreshed, signal amplitudes within servo information are compared. That is, because the degree of deterioration of signal amplitudes will differ over time according to recording wavelength, the signal degradation of servo information is detected by comparing signal amplitudes. For this reason, first, servo information refresh becomes possible inside the drive. Second, signal degradation can be detected by merely reading servo information, and a servo information write process is not necessary to detect signal degradation. Thus, signal degradation can be detected without sacrificing servo information-based positioning.

In another information refresh method of the present invention, the re-recording step comprises a step for re-recording the servo information of the above-mentioned storage medium while positioning the above-mentioned head using other servo information of the above-mentioned storage medium.

In this aspect, to prevent positioning from becoming unstable in the re-recording of servo information due to the servo information thereof not being able to be read in, positioning is performed by other servo information. In accordance therewith, it is possible to prevent positioning from becoming unstable during the re-recording of servo information, and servo information refresh becomes possible in the drive itself.

The information refresh method of the present invention further has a step for detecting data to be simultaneously written to the data that determines the need for the above-mentioned refresh, and a step for re-recording the above-mentioned detected data on the above-mentioned storage medium using the above-mentioned head.

In this aspect, simultaneously written data is refreshed even without checking as data disappearance is highly likely. Thus, the time required for checking refresh can be greatly shortened.

A separate information refresh method of the present invention comprises a step for reading via a head the information of a storage medium, and thereafter storing the information in memory to prevent the disappearance of the above-mentioned storage medium information, a step for re-recording information on the above-mentioned storage medium via the above-mentioned head, and a step for outputting the above-mentioned memory information as the above-mentioned read data when read access of the information in the above-mentioned re-recording occurs during the above-mentioned re-recording.

In this aspect, the object is to perform constant refresh. Thus, it becomes possible to protect data even on high-density storage media for which heat fluctuation is apt to occur. Further, because re-recorded data is stored in memory, even if there is a read access during re-recording, the access thereof is not delayed. That is, the deterioration of access performance can be prevented even while performing constant refresh.

DESCRIPTION OF THE PREFERRED EMBODIMENTS

The preferred embodiments of the present invention will be explained hereinbelow by dividing into a recording and reading system, a data refresh process, another data refresh process, a servo refresh process, and a constant refresh process.

[Recording and Reading System]

Figure 1:
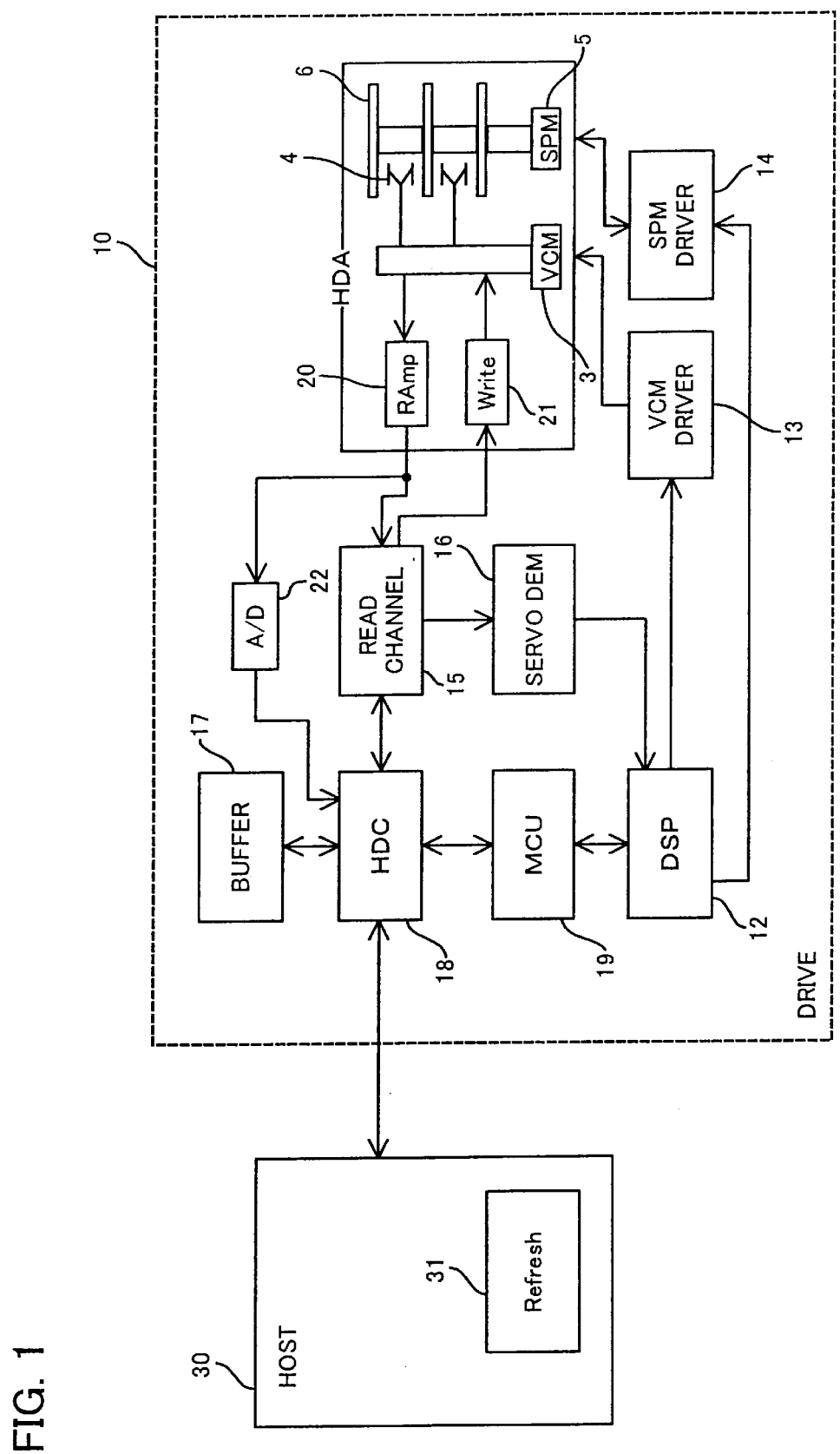
FIG. 1 is a block diagram of a recording and reading system of an aspect of the embodiment of the present invention.
Figure 2:
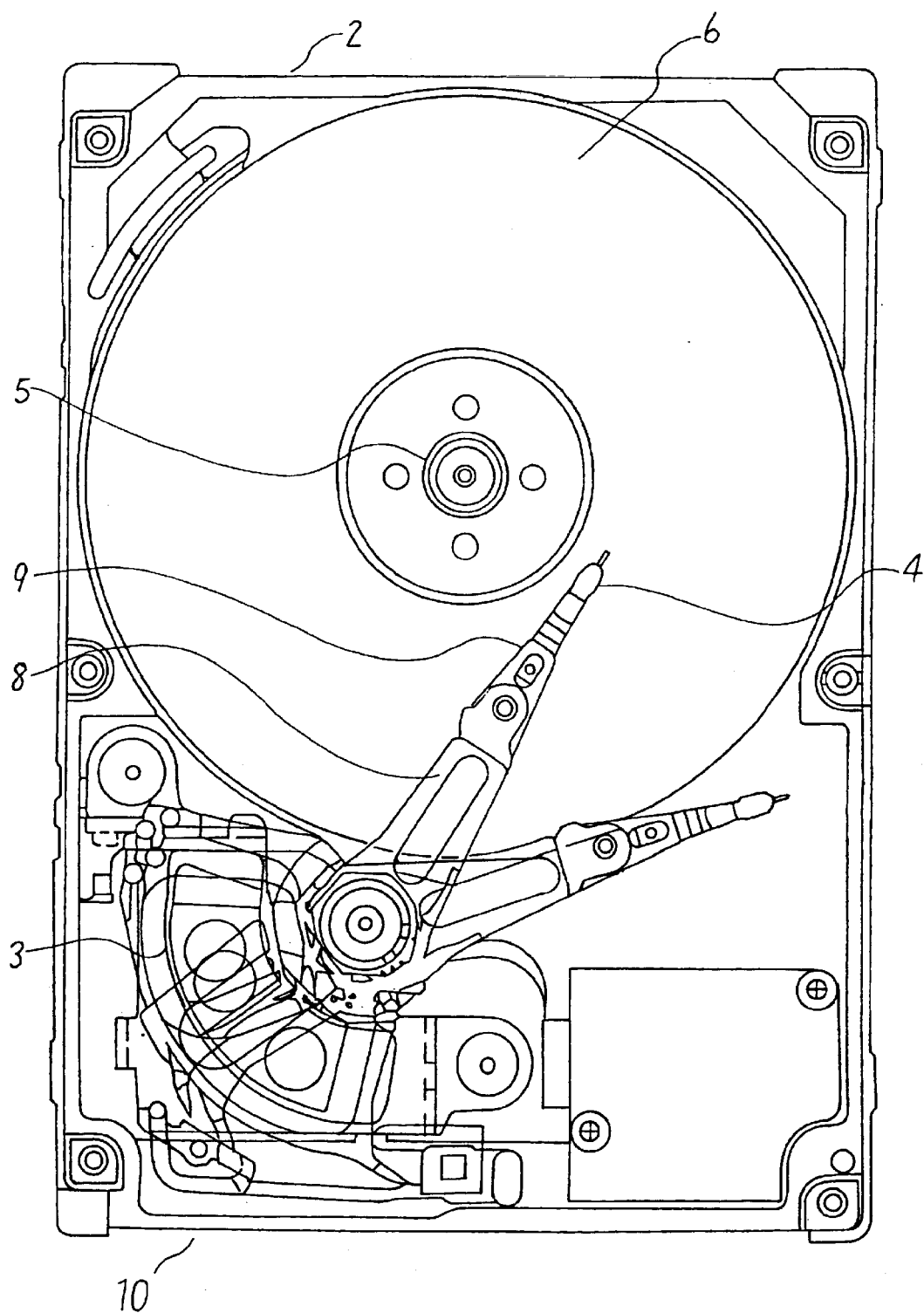
FIG. 2 is an overhead view of the hard disk drive of FIG. 1.
Figure 3:
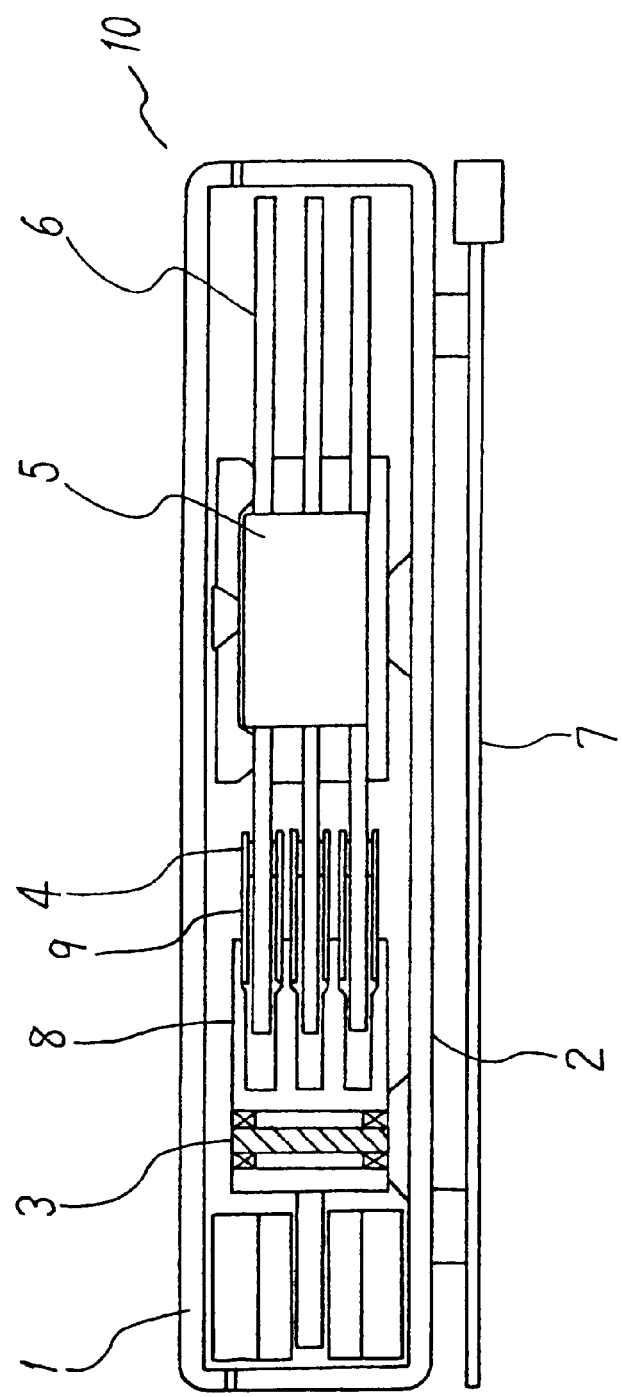
FIG. 3 is a cross-sectional view of the hard disk drive of FIG. 1.
Figure 4:
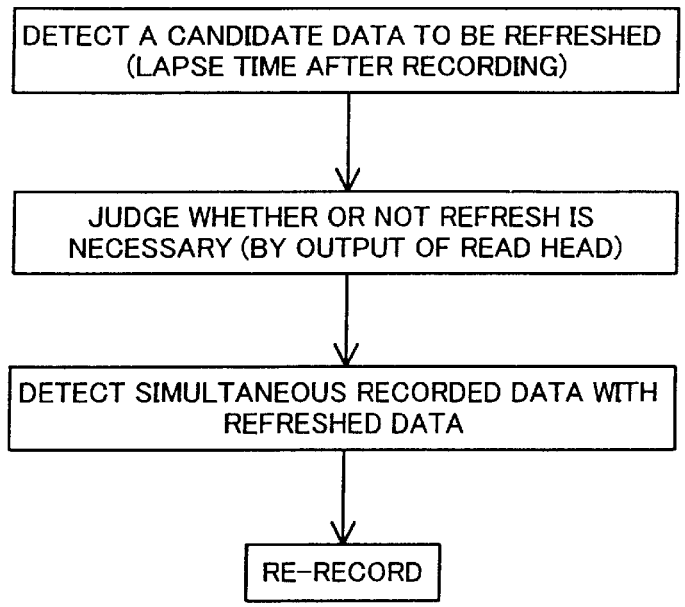
FIG. 4 is an explanation of a refresh operation of FIG. 1.

FIG. 1 is a block diagram of a recording and reading system of an aspect of the embodiment of the present invention, FIG. 2 is an overhead view of the drive device thereof, FIG. 3 is a cross-sectional view of the drive thereof, and FIG. 4 is an explanation of a refresh operation thereof. In this example, a hard disk device is used as an example of a recording and reading drive.

As shown in FIG. 1, host 30 is connected to hard disk drive 10. Host 30 is constituted, for example, as a personal computer, and has refresh processing function 31, which is explained in FIG. 4. Furthermore, specific examples of refresh processing will be explained in detail in FIG. 6 and FIG. 7, which will be explained hereinbelow. Hard disk drive 10, as is known, reads and writes data to a magnetic disk using a magnetic head.

The constitution of hard disk drive 10 will be explained by referring to FIG. 2 and FIG. 3. As shown in FIG. 2 and FIG. 3, a magnetic disk 6 has a magnetic recording layer on a substrate (disk). Magnetic disk 6 is 2.5 inches in size, and 3 disks are provided inside the drive 10. Spindle motor 5 supports and rotates magnetic disk 6. Magnetic head 4 is provided on an actuator. The actuator has rotating voice coil motor (VCM) 3, arm 8, and flexure (suspension) 9. Magnetic head 4 is mounted at the tip of flexure 9.

Magnetic head 4 reads data of magnetic disk 6, and writes data. Here, magnetic head 4 is constituted from a recording head and a read head (MR head). Actuator 3 positions magnetic head 4 on a desired track of magnetic disk 6. Actuator 3 and spindle motor 5 are disposed on drive base 2. Cover 1 covers drive base 2, and isolates drive internal portions from the outside. Printed circuit board 7 is disposed below drive base 2, and is equipped with a drive control circuit.

Returning to FIG. 1, the control circuit of hard disk drive 10 will be explained. Hard disk controller (HDC) 18 generates magnetic disk device internal control signals for controlling the interface with the host CPU, such as receiving various commands for host CPU 30 and receiving data, and for controlling recording and read formats on a magnetic disk medium. Buffer 17 is used to temporarily store write data from the host CPU, and to temporarily store read data from a magnetic disk medium.

Micro-controller (MCU) 19 is constituted from a microprocessor (MPU) or the like. MCU (hereinafter referred to as MPU) 19 is linked to HDC 18 and digital signal processor (DSP) 12, and performs control of a magnetic disk device. DSP 12 performs servo control for positioning a magnetic head. That is, DSP 12 executes a program stored in memory, recognizes a position signal from servo demodulator circuit 16, controls the VCM control current of VCM drive circuit 13, and controls the drive current of spindle motor (SPM) drive circuit 14.

VCM drive circuit 13 is constituted from a power amp for causing drive current to flow in voice coil motor (VCM) 3. SPM drive circuit 14 is constituted from a power amp for causing drive current to flow to SPM 5, which rotates a magnetic disk.

Read channel 15 is a circuit for carrying out recording and reading. Read channel 15 has a modulator circuit and parallel-serial converter for recording write data from the host CPU onto magnetic disk medium 6, and a demodulator circuit and serial-parallel converter for reading data from magnetic disk medium 6. Servo demodulator circuit 16 is a circuit for demodulating a servo pattern recorded on magnetic disk medium 6, and has a position detecting circuit.

Further, inside drive HDA, there is provided a head IC, into which is built a write amp 21 for supplying magnetic current to magnetic head 4, and a preamp 20 for amplifying read-out voltage from magnetic head 4. Analog/digital converter (A/D) 22 converts read-out output from preamp 20 to a digital value, and outputs it to HDC 18. A/D 22 is used to measure the read-out output level at a refresh operation, which will be explained hereinbelow.

Data refresh processing function 31 of host 30 will be explained by referring to FIG. 4. Firstly, host 30 detects candidate data to be refreshed. For this reason, host 30 reads out the time information of each data file from magnetic disk 6 of disk drive 10, and measures the elapsed time since recording. And then, host 30 detects as a refresh candidate a data file for which the elapsed time exceeds a prescribed time.

Next, the read-out output level of this refresh candidate data is measured. The same data as to the read out data is re-written, then the read-out output level thereof is measured, and the ratio of both read out output levels is calculated. If the calculated ratio is less than a prescribed ratio, it is treated as data to be refreshed, and re-recording is performed. Furthermore, data recorded at the same time as this refresh data is detected, and these data are also re-recorded.

In this manner, a refresh candidate is selected based on elapsed time, this selected candidate's readout output level is measured, and data to be refreshed is ultimately selected. Thus, because the read-out output level of data is directly and ultimately measured, data that needs to be refreshed can be accurately selected. Further, since a rough selection based on elapsed time is performed prior thereto, the number of data for which read-out output levels are measured can be reduced from a huge volume of data. In accordance therewith, processing time can be shortened.

Furthermore, because a change in an output level is determined from the ratio of read-out output levels, the quantity of change of an output level can be accurately detected and data requiring refresh can be accurately selected, even if the characteristics of a storage medium and a head differ.

In accordance therewith, it is possible to refresh only data that needs to be refreshed, and to shorten processing time.

Because this kind of refresh control is generally performed when ordinary read/write is not being carried out, the effect of shortening processing time is advantageous in that an ordinary read/write operation is not delayed.

Here, a magnetic disk device is described as an example of a recording and reading device, but a magnetic tape device, magnetic card device, or a magnetooptical recording device can also be used. That is, a storage medium of the present invention is not limited to an in-plane magnetic recording medium, but rather alludes to a magnetooptical medium and so forth. Further, a head is not limited to magnetic recording, but rather also includes optical recording. Furthermore, a storage medium is not limited to a fixed medium inside a drive, but rather can also be a replaceable medium.

Similarly, refresh function 31 is provided in host 30, but refresh function 31 related to MCU 19 can, for example, also be provided inside a drive 10. In accordance therewith, refresh becomes possible via the drive itself. In this case, the output of A/D converter 22 is inputted directly to MCU 19, and refresh process function 31 is provided in MCU 19. Furthermore, refresh function 31 can also be divided between host 30 and drive 10.

Furthermore, data to be refreshed is indicated as user data, but includes servo data and other such control data.

[Data Refresh Process]

Figure 5:
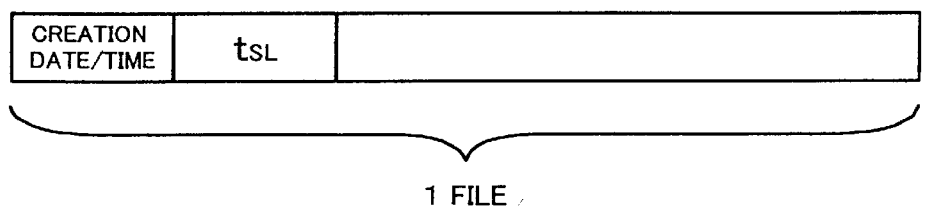
FIG. 5 is an illustration of a file structure of an aspect of the embodiment of the present invention.
Figure 6:
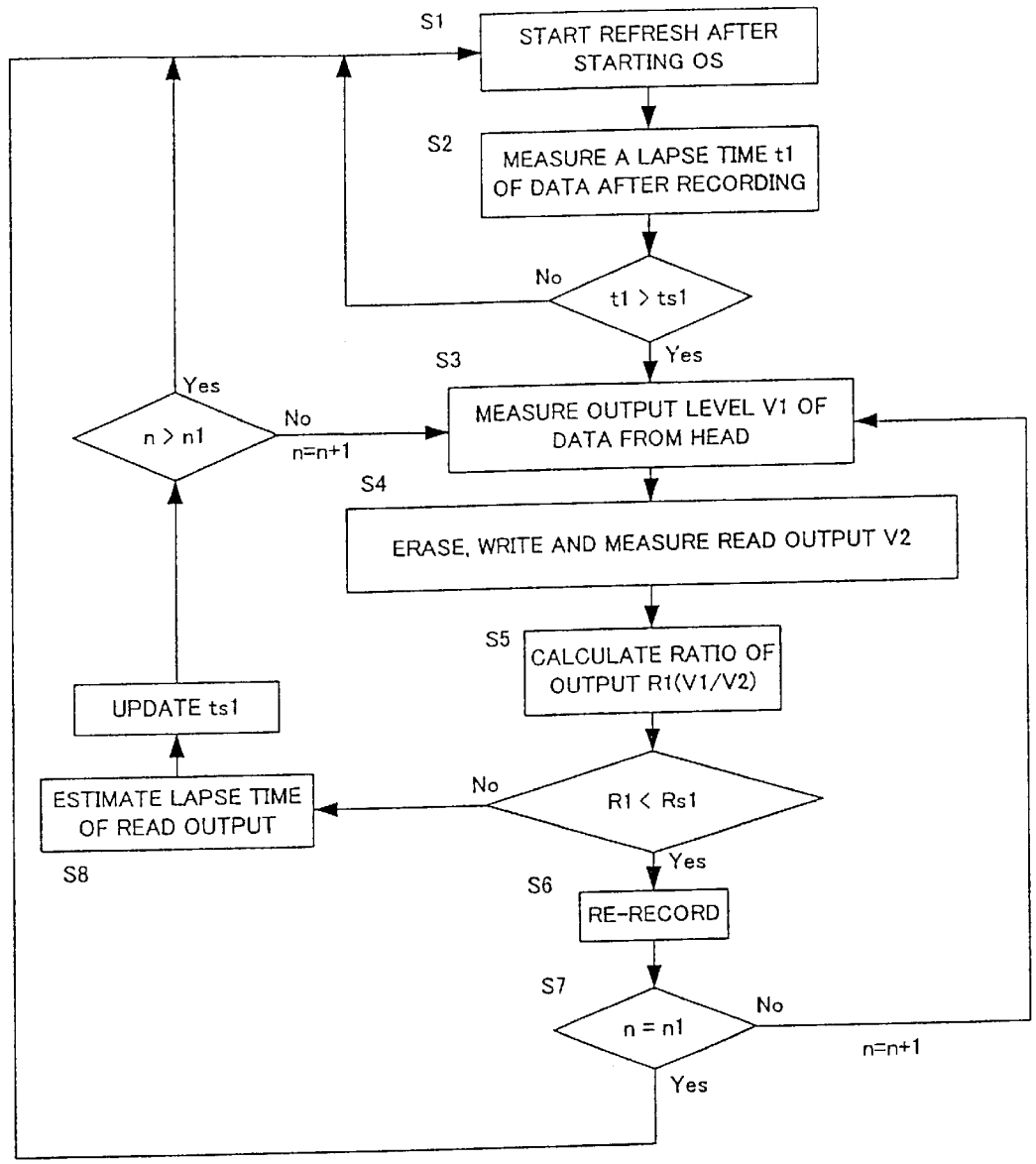
FIG. 6 is a flowchart of refresh processing of an aspect of the embodiment of the present invention.

FIG. 5 is an illustration of a file structure of an aspect of the embodiment of the present invention, and FIG. 6 is a flowchart of a refresh process of an aspect of the embodiment of the present invention. Processing will be explained in accordance with FIG. 6.

(S1) Host 30 starts up the operating system (OS), and thereafter starts a refresh process.

(S2) Next, host 30 measures each elapsed time t1 of a mass of data. Then, host 30 detects data for which the elapsed time exceeds a prescribed time limit tsl. That is, host 30 issues a read command to read out each file in drive 10, and receives the data of each file from drive 10. As shown in FIG. 5, a file creation date and time (recording time) tr, and a file time limit tsl are stored in each file.

Host 30 finds an elapsed time t1 by calculating the difference between the present time tf and this creation time tr. And then a determination is made as to whether or not elapsed time t1 thereof is greater than a time limit tsl. The reason for setting a time limit tsl for each file will be explained hereinbelow. When an elapsed time t1 is not greater than a time limit tsl, the file thereof is not treated as a refresh candidate, and processing moves on to the next file. Conversely, when an elapsed time t1 is greater than a time limit tsl, the file thereof is extracted as a refresh candidate.

(S3) Host 30 performs checks of the read-out output levels of extracted refresh candidate files. First, to measure the read-out output of the file data thereof, host 30 issues a measure command to drive 10. In accordance therewith, drive 10 reads the file data of the disk 3 via head 4, and transfers a read-out output level V1 from HDC 18 to host 30 by way of A/D converter 22.

(S4) Next, to measure the read-out output of the file data after being rewritten on the disk 3, host 30 issues to drive 10 a write command and a measure command to measure read-out output. In accordance therewith, in drive 10, head 4 erases this file data of disk 3, and thereafter writes and reads the same file data. A read-out signal read out by head 4 is transferred from HDC 18 to host 30 via A/D converter 22 as a read-out output level V2.

This file data write operation can be a portion of the file data. For example, it can be 1 sector worth of data.

(S5) Host 30 calculates the output ratio R1=V1/V2. Then, a determination is made as to whether or not output ratio R1 is smaller than a prescribed output ratio Rs1.

(S6) In a case in which output ratio R1 is smaller than prescribed output ratio Rs1, because read-out output level V1 is relatively small, the file thereof is determined to be a refresh target, and this file is re-recorded. Further, the file creation date and time is also updated to the present time. All remaining file data (data other than the data re-recorded in the above-mentioned Step S4) in this file can also be re-recorded at this time. That is, host 30 issues to drive 10 a write command, which makes the above-mentioned remaining data the target, and drive 10 writes this data to disk 3 using head 4.

(S7) Next, a determination is made as to whether or not the number of processed files 'n' is 'n1'. Here, 'n1' is the number of refresh candidate files extracted in accordance with the above-mentioned Step S2. When the number of processed files 'n' is not 'n1', the number of processed files 'n' is updated to "n+1" and processing returns to Step S3. If the number of processed files 'n' is 'n1', refresh processing is terminated.

(S8) Conversely, in a case in which output ratio R1 is not smaller than a prescribed output ratio Rs1, read-out output level V1 is not relatively small. Therefore, there is no need for refresh. Here, if the above-mentioned time limit tsl is not changed, the same file will be selected as a refresh candidate a number of times. To prevent this, each file is provided with a time limit tsl, and this time limit tsl is updated. That is, host 30 estimates the time limit tsl that needs to have a refresh check performed next based on the size of the above-mentioned output ratio R1 and the elapsed time t1. And then the time limit of the above-mentioned file is updated with this estimated time limit tsl.

Furthermore, a determination is made as to whether or not the number of processed files 'n' exceeds 'n1'. When the number of processed files 'n' does not exceed 'n1', the number of processed files 'n' is updated to "n+1" and processing returns to Step S3. On the contrary, when the number of processed files 'n' does exceed 'n1', refresh processing is terminated.

In this manner, a refresh candidate is selected based on elapsed time, the read-out output level of this selected refresh candidate is measured, and data to be refreshed is ultimately selected. Thus, because the read-out output level is ultimately measured, data that needs to be refreshed can be accurately selected. Further, because a rough selection is performed prior thereto based on elapsed time, the number of data for which read-out output levels are measured can be reduced from a huge volume of data. In accordance therewith, processing time can be shortened.

Furthermore, because a change in an output level is determined from the ratio of read-out output levels, the quantity of change of an output level can be accurately detected and data requiring refresh can be accurately selected, even if the characteristics of a storage medium and a head differ. In accordance therewith, it is possible to refresh only data that needs to be refreshed, and to shorten processing time.

Further, by executing refresh after OS startup but prior to drive access, it becomes possible to store data before the drive is accessed.

[Another Data Refresh Process]

Figure 7:
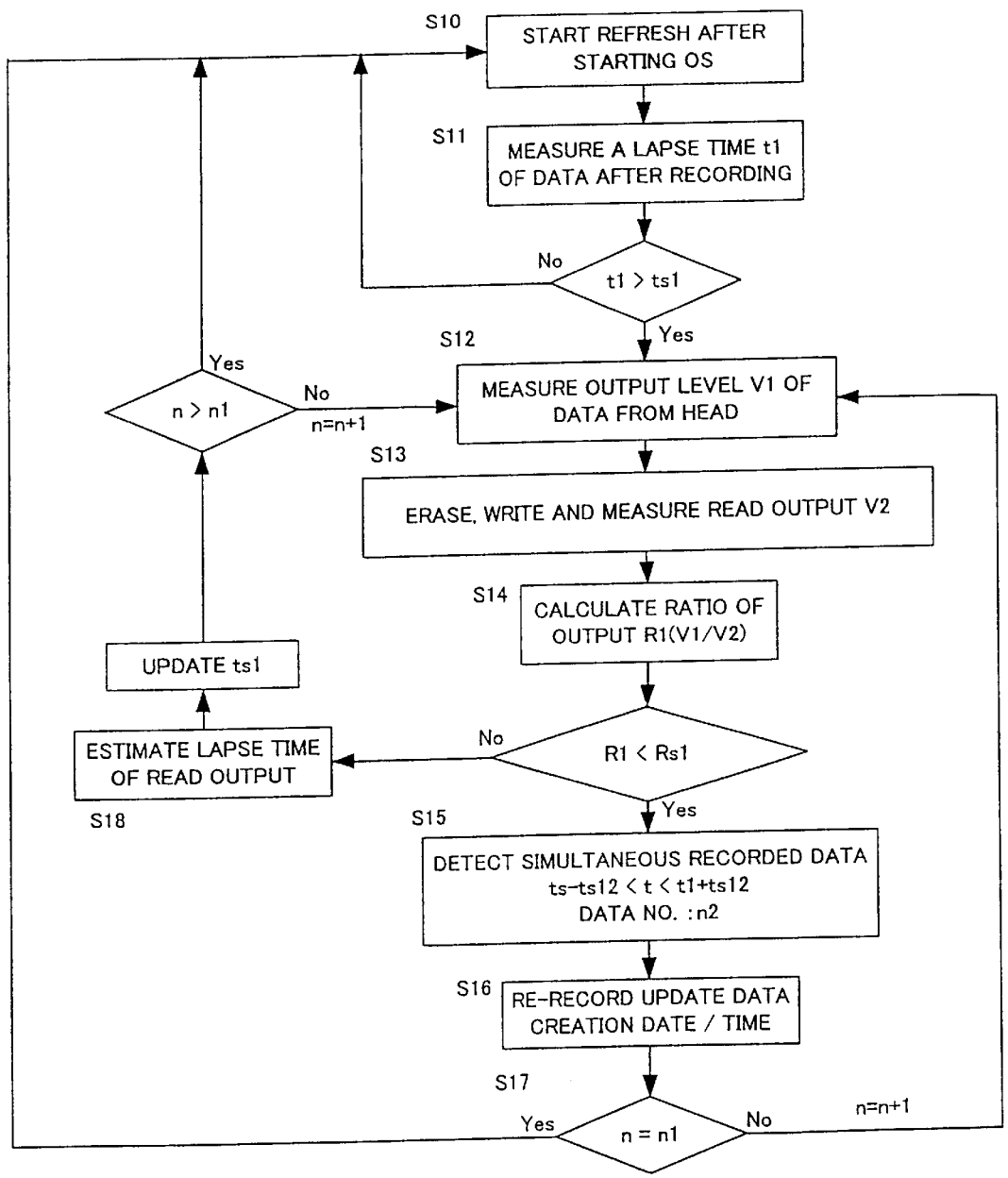
FIG. 7 is a flowchart of refresh processing of another aspect of the embodiment of the present invention.

FIG. 7 is a flowchart of a refresh process of another aspect of the embodiment of the present invention.

(S10) Host 30 starts up the OS, and thereafter, starts a refresh process.

(S11) Next, host 30 measures each elapsed time t1 of a mass of data. Then, data that the elapsed time t1 exceeds a prescribed time limit tsl is detected. That is, host 30 reads out each file in drive 10, issues a read command for reading out each file in drive 10 to drive 10, and receives the data of each file from drive 10. Host 30 finds an elapsed time t1 by calculating the difference between the present time tf and this creation time tr. And then a determination is made as to whether or not elapsed time t1 thereof is greater than a time limit tsl. When an elapsed time t1 is not greater than a time limit tsl, the file thereof is not treated as a refresh candidate, and processing moves on to the next file. Conversely, when an elapsed time t1 is greater than a time limit tsl, the file thereof is extracted as a refresh candidate.

(S12) Host 30 performs checks of the read-out output levels of extracted refresh candidate files. First, to measure the read-out output of the file data thereof, host 30 issues a measure command to drive 10. In accordance therewith, drive 10 reads the disk 3 file data thereof via head 4, and transfers read-out output level V1 from HDC 18 to host 30 by way of A/D converter 22.

(S13) Next, to measure the read-out output of the file data after writing, host 30 issues to drive 10 a write command and a measure command to measure read-out output. In accordance therewith, in drive 10, head 4 erases this file data of disk 3, and thereafter writes and reads the same file data. A read signal read out by head 4 is transferred from HDC 18 to host 30 via A/D converter 22 as read-out output level V2. This file data writing can be a portion of the file data. For example, it can be 1 sector worth of data.

(S14) Host 30 calculates the output ratio R1=V1/V2. Then, a determination is made as to whether or not output ratio R1 is smaller than prescribed output ratio Rs1.

(S15) In a case in which output ratio R1 is smaller than a prescribed output ratio Rs1, because read-out output level V1 is relatively small, the file thereof is determined to be a refresh target. Together therewith, file data created at the same time as this file is detected. That is, file data, which has an elapsed time 't' within the scope of preceding and succeeding the elapsed time 't1' of the files constituting the target thereof (t1−tsl2<t<t1+tsl2) is detected.

(S16) Then, the files that are targeted for refresh and the files of the same time period thereof are re-recorded. All remaining file data (data other than the data re-recorded in the above-mentioned Step S4) in this file is also re-recorded at this time. Further, the file data creation date and time are updated. That is, host 30 issues to drive 10 a write command, which makes the above-mentioned files the target, and drive 10 writes this data to disk 3 using head 4.

(S17) Next, a determination is made as to whether or not the number of processed files 'n' is 'n1'. Here, 'n1' is the number of refresh candidate files extracted in accordance with the above-mentioned Step S11. When the number of processed files 'n' is not 'n1', the number of processed files 'n' is updated to "n+1" and processing returns to Step S12. If the number of processed files 'n' is 'n1', refresh processing is terminated.

(S18) Conversely, in a case in which output ratio R1 is not smaller than a prescribed output ratio Rs1, read-out output level V1 is not relatively small. Therefore, there is no need for refresh. Here, if the above-mentioned time limit tsl is not changed, the same file will be selected as a refresh candidate a number of times. To prevent this, each file is provided with a time limit tsl, and this time limit tsl is updated. That is, host 30 estimates the time limit tsl that needs to have a refresh check performed next based on the size of the above-mentioned output ratio R1 and the elapsed time t1. And then the time limit of the above-mentioned file is updated using this estimated time limit tsl.

Furthermore, a determination is made as to whether or not the number of processed files 'n' exceeds 'n1'. When the number of processed files 'n' does not exceed 'n1', the number of processed files 'n' is updated to "n+1" and processing returns to Step S12. On the contrary, when the number of processed files 'n' does exceed 'n1', refresh processing is terminated.

This aspect of the embodiment is in addition to the one of FIG. 6, and detects files that were created at the same time (within a certain scope) as the files, which constitute the refresh target, and these files are re-recorded together. Thus, refresh can be performed in an even shorter time.

[Servo Refresh Process]

Because servo data is recorded the same as ordinary data, the signal quality of servo data also deteriorates due to thermal fluctuation. Thus, servo data also needs to be refreshed. However, in the past, because servo information constitutes a position reference, this information was generally written to a magnetic disk using a servo track writer (STW), which is capable of recognizing an absolute position, and could not be written with a drive. That is, refresh reportedly could not be performed for servo information. Here, there is presented, first, a method for detecting signal degradation from servo information itself, and second, a method for performing positioning control using servo information while re-recording servo information. In accordance therewith, servo information refresh becomes possible using the drive itself.

Figure 8:
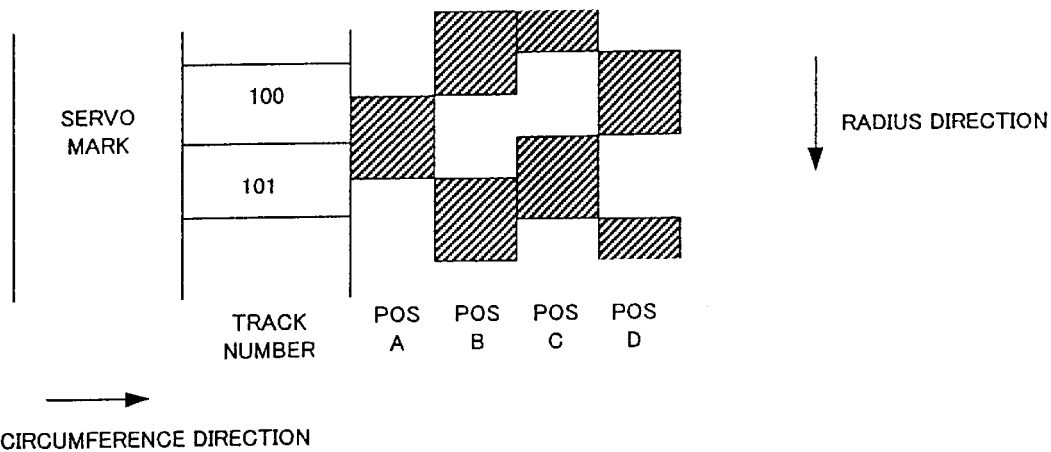
FIG. 8 is an illustration of a servo pattern of a disk of FIG. 1.
Figure 9:
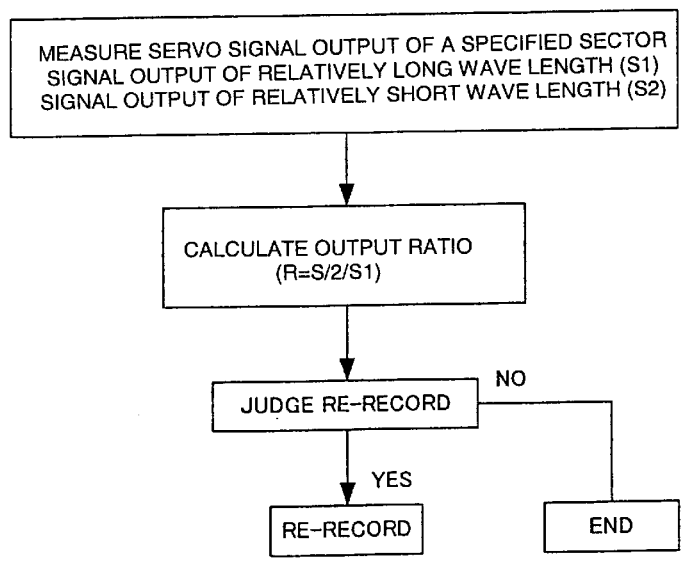
FIG. 9 is an explanation of a servo refresh function of FIG. 1.
Figure 10:
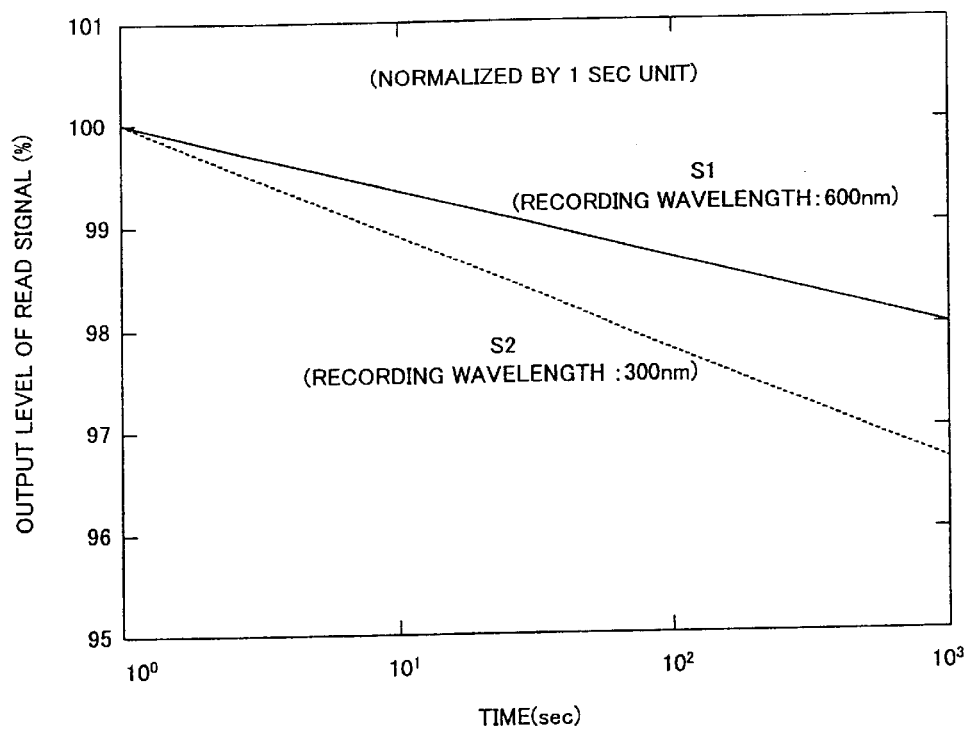
FIG. 10 is a characteristic diagram of playback output changes resulting from the wavelengths of the refresh operation of FIG. 9.
Figure 11:
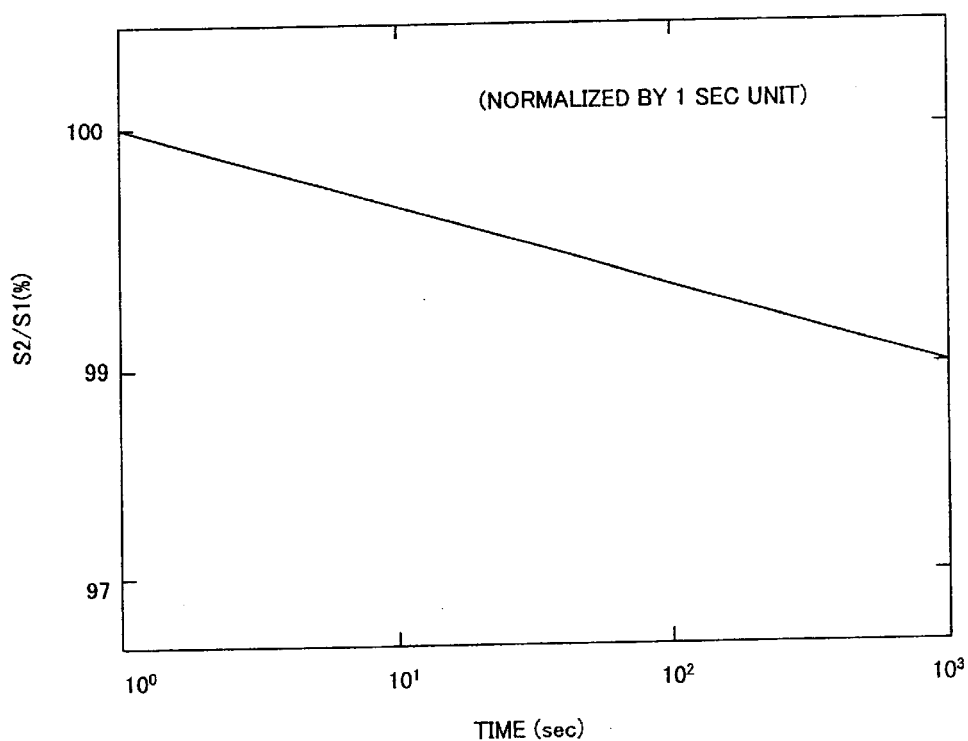
FIG. 11 is a characteristic diagram of the output ratio of the refresh operation of FIG. 9.

FIG. 8 illustrates a servo pattern of an aspect of the embodiment of the present invention, FIG. 9 is an explanation of a servo refresh function of an aspect of the embodiment of the present invention, FIG. 10 is a characteristic diagram of changes over time in the playback output of signals with different recording wavelengths, and FIG. 11 is a characteristic diagram of the output ratio for each elapsed time.

As shown in FIG. 8, a servo pattern is recorded on each sector of a magnetic disk 6. A servo pattern comprises a servo mark, track numbers, and 4 burst servo signals PosA, PosB, PosC, PosD. Of these, the servo mark designates the start of a servo pattern, and within the servo information, is the information with the longest recording wavelength. The 4 burst servo signals PosA, PosB, PosC, PosD indicate the offset quantity of the head resulting from read amplitude, and within the servo information, is the information with the shortest recording wavelength.

This aspect of the embodiment has a servo refresh function for detecting the deterioration of the signal quality of servo information by using servo information with these different wavelengths. The servo refresh function described in FIG. 9 is provided in MCU 19 in FIG. 1.

A servo refresh function will be explained in accordance with FIG. 9. As described in FIG. 9, MCU 19 measures the servo signal output of a predetermined sector. Here, of the servo signals from A/D 22, output S1 of a signal (sector mark) with the longest recording wavelength, and output S2 of a signal (burst servo signal) with the shortest recording wavelength are measured. And then, MCU 19 calculates output ratio R=S2/S1. A determination is made from this output ratio as to whether or not re-recording should be performed. The reason this output ratio is used will be explained hereinbelow using FIG. 10 and FIG. 11.

In a case in which it is determined to perform re-recording, the servo signals are re-recorded. In a case in which it is determined not to perform re-recording this processing is terminated. In this case, the servo information of all the sectors that exist on a disk surface is re-recorded. The reason for re-recording the servo information of all the sectors is because, unlike data information, the degree of deterioration of servo information written on the surface of a disk is felt to be the same since all the servo information was written at the same time.

Next, the reason for using the output ratio of output S1 of a signal (sector mark) with the longest recording wavelength, and output S2 of a signal (burst servo signal) with the shortest recording wavelength in determining the deterioration of servo signals will be explained in accordance with FIG. 10 and FIG. 11. As shown in FIG. 10, the read-out output of a signal attenuates together with the passage of time. The rate of decline of the signal with the shortest recording wavelength (300 nm) indicated by the dotted line is clearly greater than the rate of decline of the signal with the longest recording wavelength (600 nm)

indicated by the solid line. This is because the effect of the reverse magnetic field from an adjacent bit becomes greater the shorter the recording wavelength.

FIG. 11 shows the output ratio of output S1 of a signal with the longest recording wavelength, and output S2 of a signal with the shortest recording wavelength for each elapsed time. It is known that the output ratio also deteriorates according to a lapse of time. Therefore, a change of a passage of time of the output ratio in a certain disk drive is investigated, then determination conditions (decision level) for re-recording is decided by its result. And a measured output ratio is compared against the decision level, and when the output ratio is less than the decision level, a signal deterioration determination is made.

Because this method finds the ratio of outputs, deterioration can be accurately determined without being affected by changes of a passage of time in the read-out sensitivity of a magnetic head. Further, there is no need to provide a dedicated reference signal for judging signal deterioration.

Figure 12:
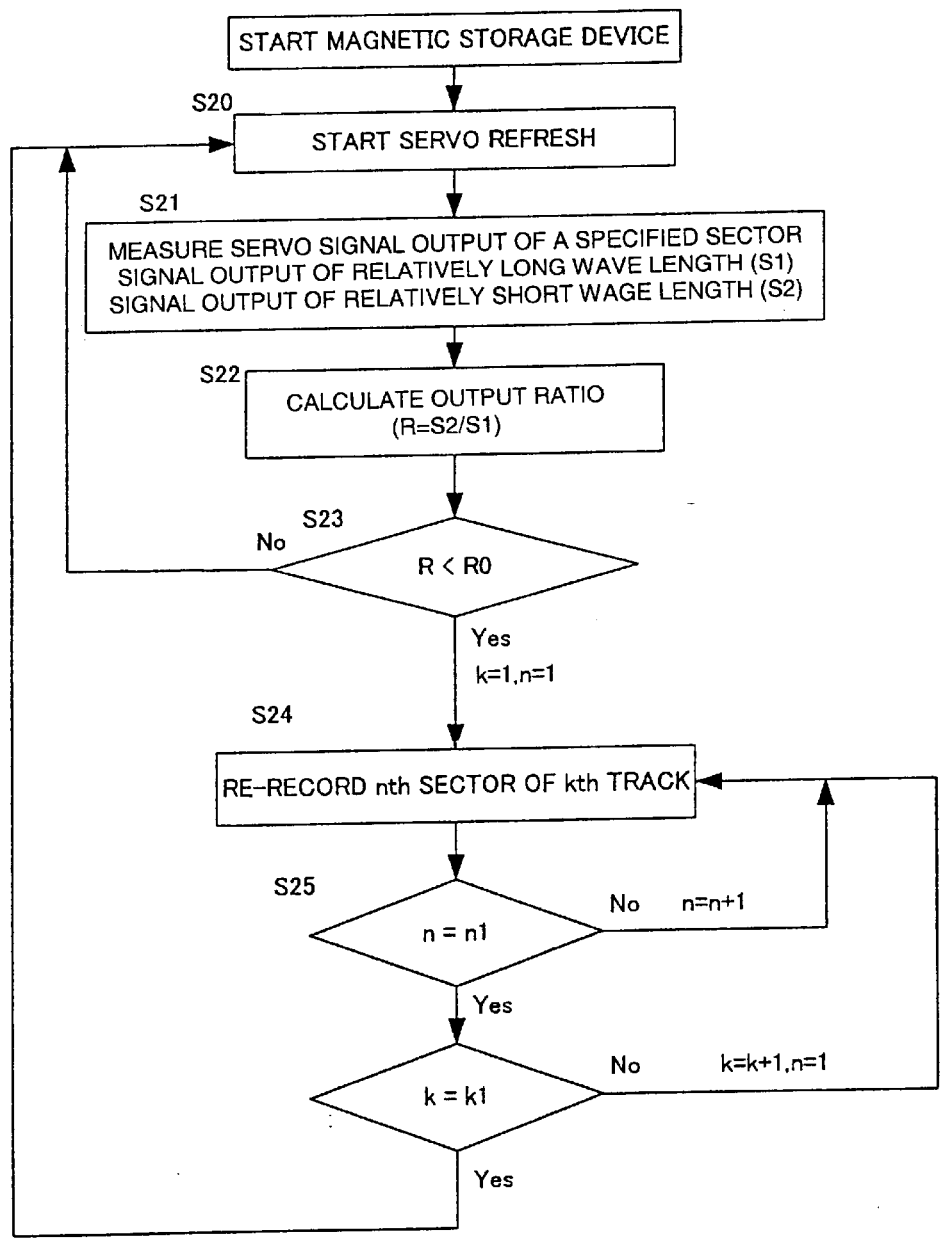
FIG. 12 is a flowchart of a servo refresh process of an aspect of the embodiment of the present invention.

FIG. 12 is a flowchart of servo refresh processing in another aspect of the embodiment of the present invention.

(S20) MCU 19 starts up, and thereafter, starts a servo refresh process.

(S21) Next, MCU 19 measures the servo signal output of a predetermined sector. Here, of the servo signals from A/D 22, output S1 of a signal (sector mark) with the longest recording wavelength, and output S2 of a signal (burst servo signal) with the shortest recording wavelength are measured.

(S22) Then, MCU 19 calculates output ratio R=S2/S1.

(S23) And then, a determination is made as to whether or not output ratio R1 is smaller than specified output ratio R0. In a case in which output ratio R1 is not smaller than specified output ratio R0, processing is terminated since there is no need for refresh.

(S24) In a case in which output ratio R1 is smaller than specified output ratio R0, since the read-out output level is relatively small, servo information is refreshed. Because all servo information is written at the same time, the servo information of all sectors is re-recorded in sequence. At this time, while the servo information of a certain sector is being re-recorded, it is not possible to perform positioning control using this servo information of the sector thereof. Thus, when the servo information of a certain sector is being re-recorded, the servo information (positioning signal) of the sector in front of re-recording sector is held, and positioning is performed during re-recording using the held servo information. By so doing, it becomes possible for servo information to be written using the drive itself. That is, MCU 19 rewrites the servo signal of the n-th sector of the k-th track.

(S25) MCU 19 checks whether or not the number of sectors 'n' has reached the maximum number of sectors 'n1'. When the number of sectors 'n' has not reached the maximum number of sectors 'n1', the number of sectors 'n' is updated to "n+1" and processing returns to Step S24. When the number of sectors 'n' has reached the maximum number of sectors n1, MCU 19 checks whether or not the number of tracks 'k' has reached the maximum number of tracks 'k1'. When the number of tracks 'k' has not reached the maximum number of tracks 'k1', the number of tracks 'k' is updated to "k+1", the number of sectors 'n' is reset to "1" and processing returns to Step S24. When the number of tracks 'k' has reached the maximum number of tracks 'k1', processing is terminated.

In this manner, the servo signals of all sectors are refreshed. This servo signal refresh time is expected to be long. Thus, in a case in which user access occurs during re-recording, servo information re-recording is stopped temporarily, and after access is completed, servo information re-recording starts immediately. By doing so, a user can perform data read/write even during a servo information refresh.

Further, servo information preferably should be constituted from an aggregate of independent bits, which are not linked together when written. This enables servo information to exist in complete form at all stages of refresh. On the contrary, in a case in which servo information is linked together when written, if all the servo information inside 1 sector is not re-recorded, discontinuous portions will occur in pre-re-recording and post-re-recording servo information, and positioning accuracy will deteriorate in the location thereof. That is, servo information of one track width should be recorded in one operation of one head.

[Constant Refresh Processing]

Thermal fluctuation is apt to readily occur in a high-density recording medium. In a case in which such a medium is utilized, refresh must be performed constantly (a constant cycle). However, if constant refresh is performed, there is the danger that user read/write access will be delayed, causing a drop in performance. This aspect of the embodiment presents a method, which does not cause read/write access to be delayed even when constant refresh is performed.

Figure 13:
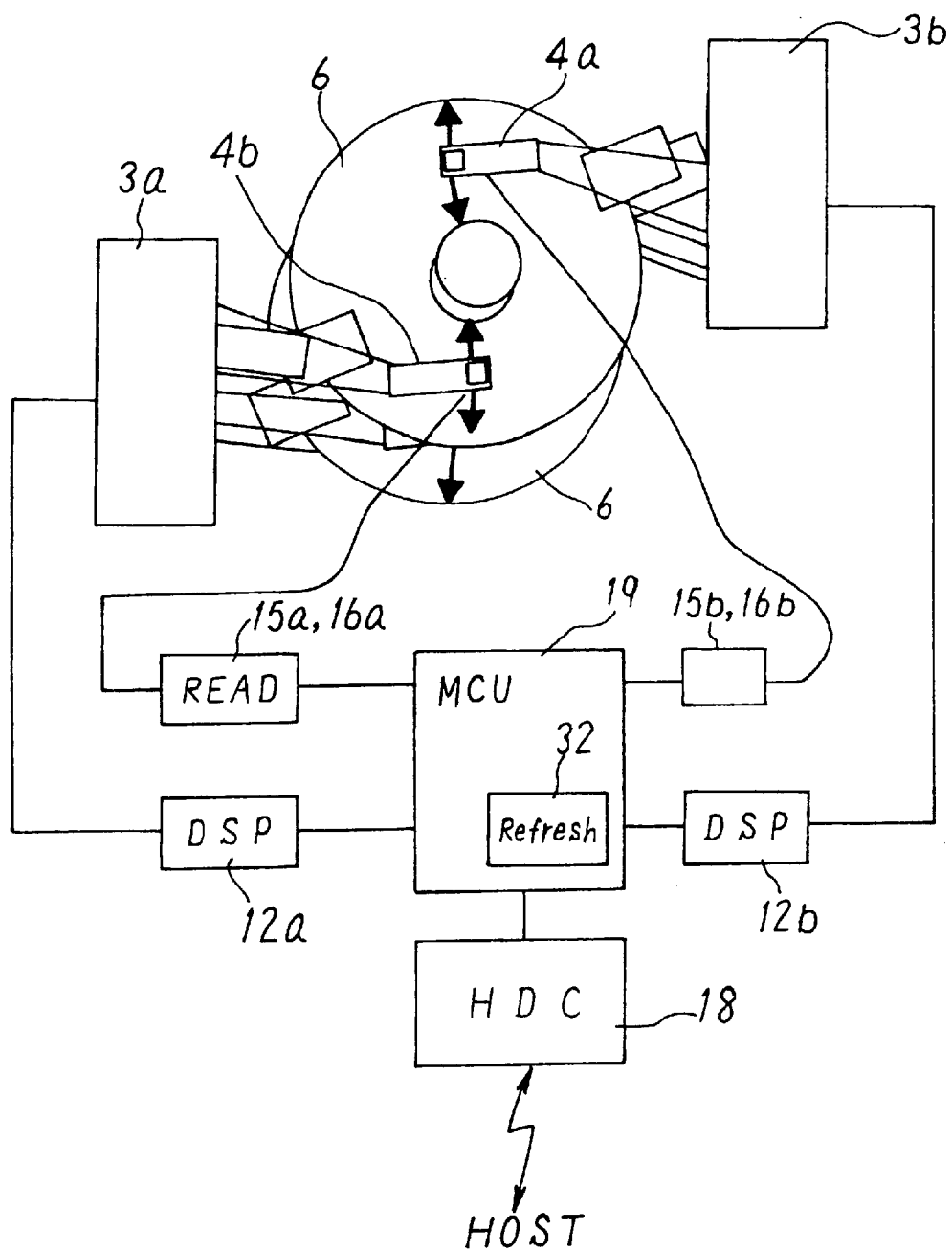
FIG. 13 is a block diagram of another drive of another aspect of the embodiment of the present invention.

FIG. 13 is a block diagram of a disk drive of a separate aspect of the embodiment of the present invention. In this figure, the same parts shown in FIG. 1 are indicated by the same symbols. In this aspect of the embodiment, for a single flat surface (platter) magnetic disk 6, there are provided 2 (a plurality of) magnetic heads 4a, 4b, and VCM 3a, 3b for driving same.

Figure 14:
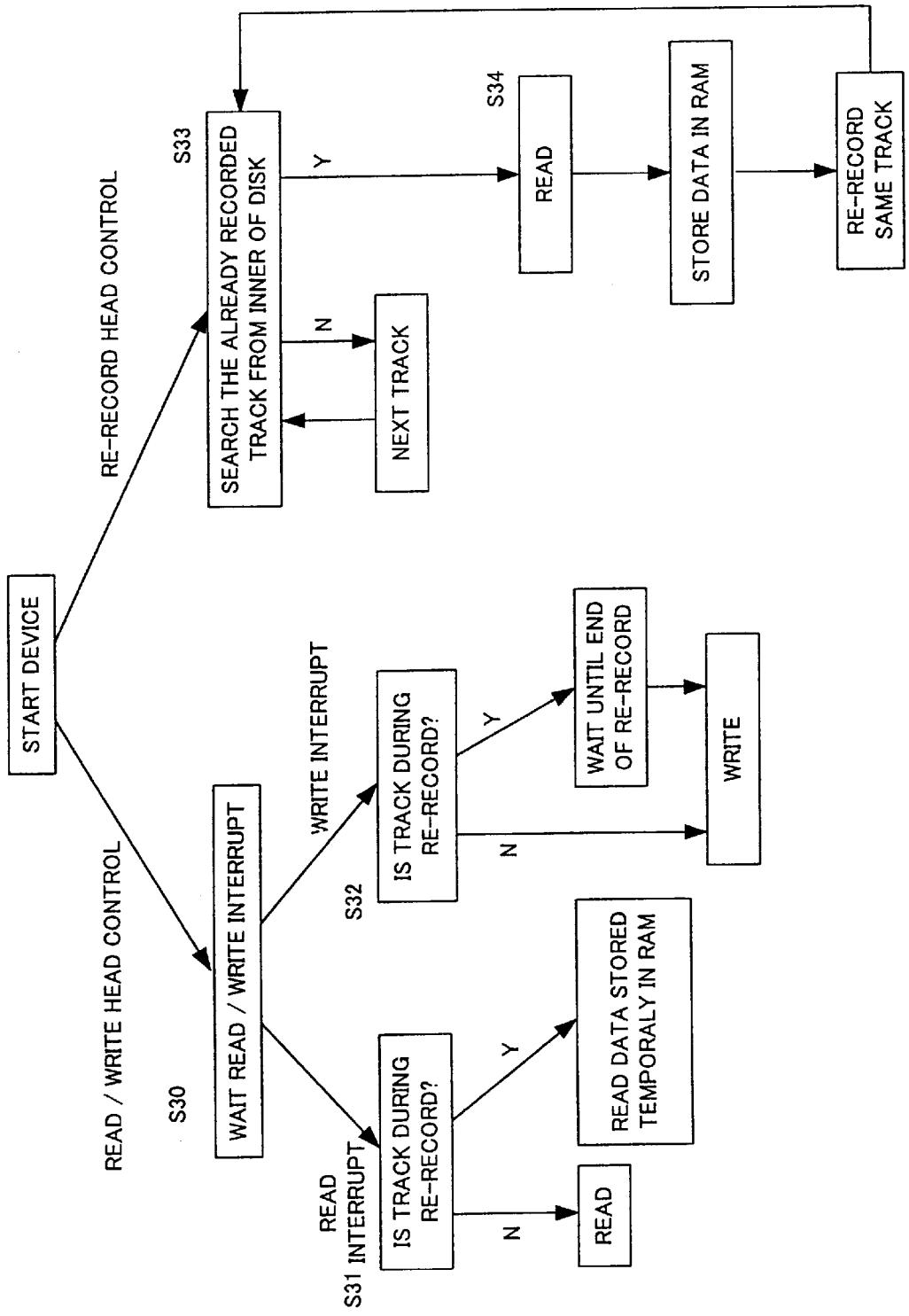
FIG. 14 is a flowchart of a constant refresh process of an aspect of the embodiment of the present invention.
Figure 15:
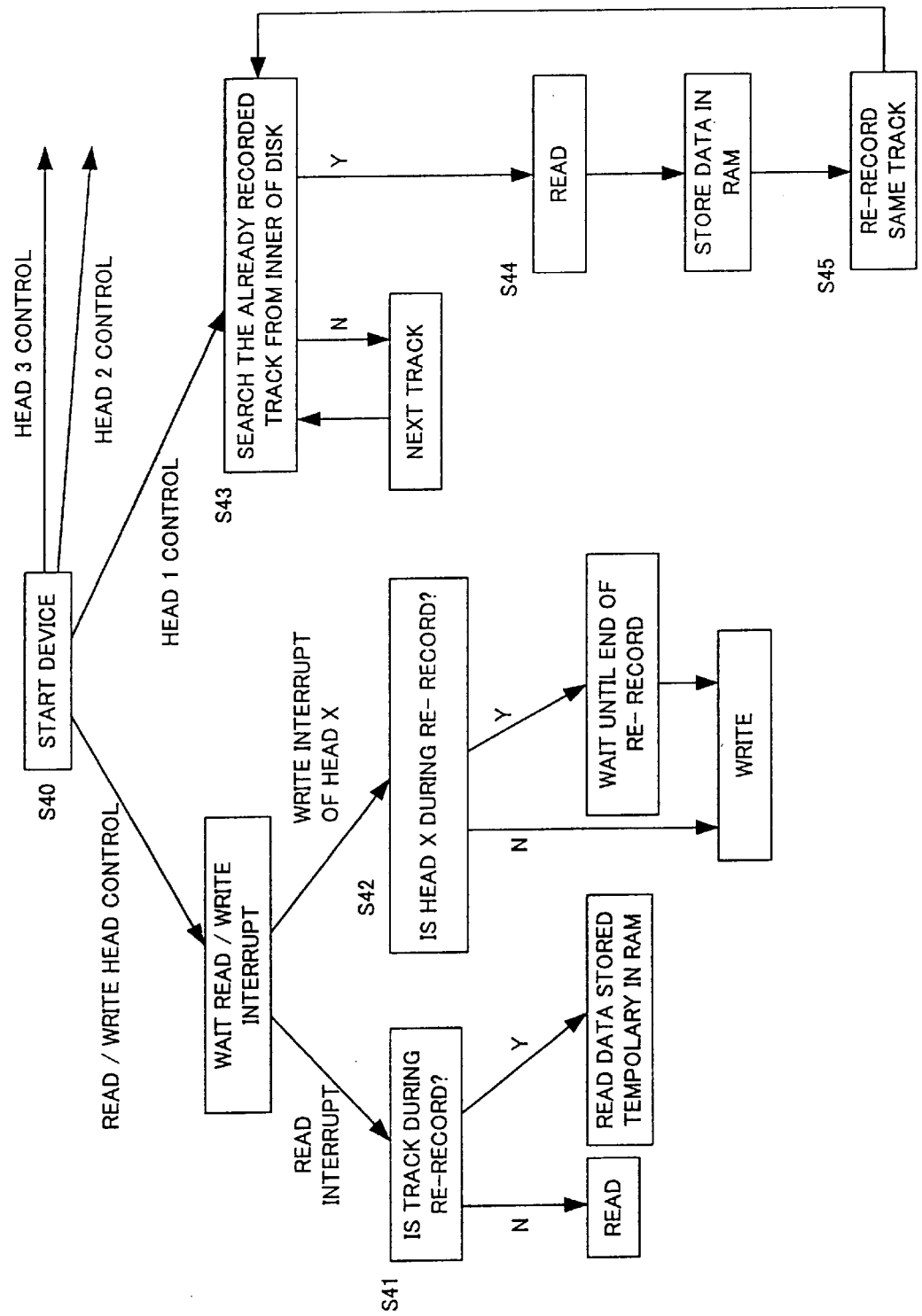
FIG. 15 is a flowchart of a constant refresh process of another aspect of the embodiment of the present invention.

Corresponding thereto, read circuits 15a, 16a, read circuits 15b, 16b, and DSP 12a, 12b are provided. The constant refresh processing function 32 shown in either FIG. 14 or FIG. 15 is provided in MCU 19. For this function, there is an example (FIG. 14) for using head 4a for recording and reading, and for using head 4b for re-recording (refresh), and an example (FIG. 15) for dividing the area of a magnetic disk surface into an area handled by the head 4a and another area handled by the head 4b.

FIG. 14 is a flowchart of constant refresh processing of an aspect of the present invention.

(S30) Recording and read-out head control is started after the device is started up, and controls head 4a. First, the control becomes a wait state of recording and reading interrupt.

(S31) When a read interrupt is received, a check is performed as to whether or not this targeted track is a track undergoing re-recording. In a case in which this targeted track is not a track undergoing re-recording, reading is carried out as-is. That is, VCM 3a is being controlled to position head 4a on the targeted track, and data of the targeted sector is read-out by head 4a, then transferred to the host, and the operation is terminated.

In a case in which this targeted track is a track undergoing re-recording, reading cannot be carried out by head 4a. Thus, as will be explained hereinbelow, data temporarily stored in random access memory (RAM) in Step S34 is read out, and transferred to the host.

(S32) When there is a recording interrupt, a check is performed as to whether or not this targeted track is a track undergoing re-recording. In a case in which this targeted track is not a track undergoing re-recording, recording is carried out as-is. That is, VCM 3a is being controlled to position head 4a on the targeted track, and then host data is recorded to the targeted sector by head 4a. And the operation is terminated. In a case in which this targeted track is a track undergoing re-recording, recording cannot be carried out by head 4a. Thus, recording is delayed until the re-recording of the track thereof has ended. Thereafter, host data is recorded on this track.

(S33) Re-recording head control is started after the device is started up, and controls head 4b. First, the place thereof (track) is checked from the inside perimeter of the disk as to whether or not recording is already performed. In a case in which recording is not already performed, because recording has not been carried out, processing skips to the next track.

(S34) If recording is already performed, reading is carried out for the track thereof by head 4b, and the read data is temporarily stored in RAM.

(S35) Next, the data stored in RAM is re-recorded in the same track. Then, processing returns to Step S33.

In this manner, since a plurality of heads are provided for a single surface of a magnetic disk, and one side is used for recording and reading, and the other side is used for re-recording, read/write access is not delayed even if constant re-recording is performed. Further, with regard to accessing the same track that is undergoing re-recording, because data is stored at re-recording, it is possible to prevent read access from being delayed.

FIG. 15 is a flowchart of a constant refresh process of another aspect of the present invention.

(S40) MCU 19 performs recording and playback head control and refresh control for each magnetic head. Here, the area of a single flat surface of a magnetic disk is divided up among three heads. That is, magnetic head 1 is in charge of the inner perimeter side, magnetic head 2 is in charge of the middle, and magnetic head 3 is in charge of the outer perimeter side. The recording and reading head control of each magnetic head is started after device startup, and controls each head. First, control becomes a wait state of recording and reading interrupt.

(S41) When there is a reading interrupt, a check is performed as to whether or not this targeted track is a track undergoing re-recording. In a case in which this targeted track is not a track undergoing re-recording, reading operation is carried out as-is. That is, VCM 3a is being controlled to position the head therefor on the targeted track, and data of the targeted sector is read out by this head and transferred to the host, and the operation is terminated.

In a case in which this targeted track is a track undergoing re-recording, reading operation cannot be carried out by this head. Thus, as will be explained hereinbelow, data temporarily stored in RAM in Step S44 is read out, and transferred to the host.

(S42) When there is a recording interrupt, a check is performed as to which is the magnetic head X for this targeted track of the recording, and a check is performed as to whether or not this relevant magnetic head is performing re-recording. In a case in which this relevant head is not carrying out re-recording, recording is carried out as-is. That is, VCM 3a is being controlled to position this relevant head on the targeted track, and host data is recorded to the targeted sector by the head, and the operation is terminated. In a case in which this head is carrying out re-recording, the recording processing is delayed until the re-recording of this head is ended. Thereafter, host data is recorded to the targeted track by this head.

(S43) Re-recording head control is also started together with device startup, and first, the place thereof (track) is checked from the inside perimeter of the disk as to whether or not recording is already performed on the track. In a case in which recording has not been performed, because recording has not been carried out, processing skips to the next track.

(S44) If recording has performed on the track, read operation is carried out for this track by the head, and read data is stored temporarily in RAM.

(S45) Next, the data stored in RAM is re-recorded in the same track. Then, processing returns to Step S43.

In this manner, since a plurality of heads are provided for a single surface of a magnetic disk, the area is divided up, and the plurality of heads are used for recording and reading, and for re-recording, read/write access is not delayed even if constant re-recording is performed. Further, with regard to accessing the same track that is undergoing re-recording, because data is stored at re-recording, it is possible to prevent read access from being delayed.

The idea for storing read data in RAM like this can also be applied in a disk drive, which provides one magnetic head for a single flat surface of a magnetic disk for performing both recording and playback, and re-recording.

Figure 16:
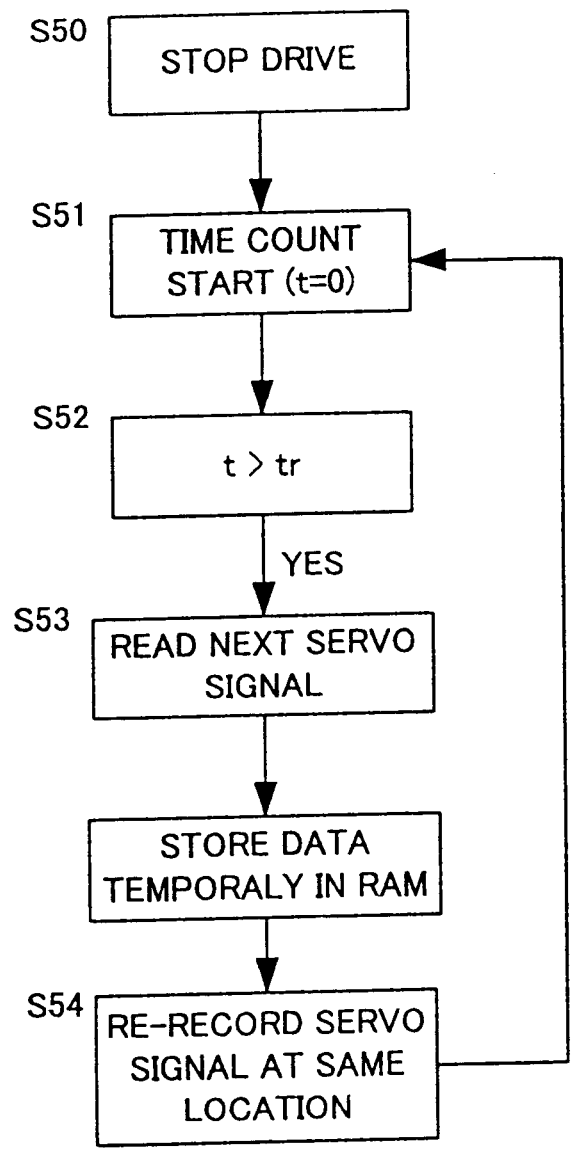
FIG. 16 is a flowchart of a servo signal refresh process of an aspect of the embodiment of the present invention.

FIG. 16 is a flowchart of a servo signal refresh process of a separate aspect of the embodiment of the present invention.

(S50) In this aspect of the embodiment, in a state in which power is not inputted to a drive from the outside, servo information is refreshed in sequence in a state in which the drive is capable of operating on internal power. That is, a servo refresh process starts up when a device is stopped.

(S51) MCU 19 starts time counter T.

(S52) MCU 19 makes a determination as to whether or not counter T has exceeded a reference time tr, which is stipulated for a prescribed interval. When counter T has not exceeded this reference time tr, processing waits until counter T does exceed this reference time tr.

(S53) When counter T has exceeded the reference time tr, the subsequent servo signal is read out by a head, and data is stored temporarily in RAM.

(S54) Next, the data stored in RAM is re-recorded in the same location. Then, processing returns to Step S51.

In this manner, because servo refresh is carried out when external power is OFF and a user is not using a disk drive, servo refresh is enabled without delaying user access. Furthermore, data refresh is carried out when external power is ON. Thus, servo refresh is enabled even when the capacity of internal power (for example, a battery) is small.

The above has been an explanation of the present invention in accordance with the aspects of the embodiment, but various modifications are possible within the scope of the gist of the present invention, and these modifications will not be excluded from the scope of the present invention.

As explained hereinabove, the following effects are manifested according to the present invention.

(1) Because the read-out output level of actual data is monitored, data deterioration can be directly viewed, and refresh data can be accurately detected.

(2) Furthermore, because the read-out output level of actual data is referenced, it is possible to prevent wasting storage area.

(3) Servo information can be refreshed using a drive.

(4) It is possible to prevent user access delay even during constant refresh.

What is claimed is:

1. An information refresh method for re-recording information on a storage medium via a head to prevent a disappearance of said information on said storage medium, comprising the steps of:

reading a target information of said storage medium using said head;

measuring a read out output level of said target information from the output of said head;

determining whether or not refresh is necessary for said target information according to said measured output level;

re-recording said target information requiring refresh on said storage medium using said head;

detecting other information written on said storage medium requiring refresh by comparing write times of said other information and said target information requiring refresh; and re-recording said detected other information on said storage medium using said head when said write time of said other information is within a predetermined time period of said write time of said target information.

2. An information refresh method for re-recording information on a storage medium via a head to prevent a disappearance of said information on said storage medium, comprising the steps of:

detecting candidate information to be refreshed by measuring the passage of time from when each information was written;

reading a portion of said detected candidate information of said storage medium using said head;

measuring a first output level of said portion of the candidate information via said head;

writing said portion of the candidate information at the same location on said storage medium, and thereafter, performing read out of said portion;

measuring a second output level of said read portion of candidate information;

determining whether or not said refresh is necessary for said candidate information from the ratio of said first and second output levels; and re-recording information requiring said refresh on said storage medium using said head.

3. A storage system comprising;

a head for reading and writing on and from a storage medium; and a controller for controlling said reading and writing operation of said head;

wherein said controller reads a target information of said storage medium using said head, measures a read out output level of said target information from the output of said head, determines whether or not refresh is necessary for said target information according to said measured output level, re-records said target information requiring said refresh at the same location on said storage medium using said head;

detects other information written on said storage medium requiring refresh by comparing write times of said other information and said target information; and re-records said detected other information on said storage medium using said head when said write time of said other information is within a predetermined time period of said write time of said target information.

4. A storage system comprising:

a head for reading and writing on and from a storage medium; and a controller for controlling said reading and writing operation of said head;

wherein said controller measures a first output level of a portion of candidate information via said head, writes said portion of the candidate information to said storage medium at the same location, and thereafter, performs read out of said portion, measures a second output level of said read portion of the candidate information, determines whether or not refresh is necessary for said candidate information from the ratio of said first and second output levels, and re-records information requiring said refresh on said storage medium using said head.

5. A storage medium having a refresh program for re-recording information on the storage medium via a head to prevent a disappearance of said information on said storage medium, said refresh program comprising:

a first program for reading a target information of said storage medium using said head;

a second program for measuring a read out output level of said target information from the output of said head;

a third program for determining whether or not refresh is necessary for said target information according to said measured output level; and a fourth program for re-recording said target information requiring refresh at the same location on said storage medium using said head;

a fifth program for detecting other information written on said storage medium requiring refresh by comparing writing times of said other information and said target information requiring refresh; and a sixth program for re-recording said detected other information on said storage medium using said head when said write time of said other information is within a predetermined time period of said write time of said target information.

6. A storage medium having a refresh program for re-recording information on the storage medium via a head to prevent a disappearance of said information on the storage medium, said refresh program comprising:

a first program for detecting candidate information to be refreshed by measuring the passage of time from when each information was written;

a second program for reading a portion of said candidate information of said storage medium using said head;

a third program for measuring a first output level of said portion of the candidate information via said head;

a fourth program for writing said portion of the candidate information at the same location on said storage medium, and thereafter, performing read out of said portion;

a fifth program for measuring a second output level of said read portion of candidate information;

a sixth program for determining whether or not said refresh is necessary for said candidate information from the ratio of said first and second output levels; and a seventh program for re-recording information requiring said refresh on said storage medium using said head.

* * * * *

UNITED STATES PATENT AND TRADEMARK OFFICE
CERTIFICATE OF CORRECTION

PATENT NO. : 6,809,893 B2
DATED : October 26, 2004
INVENTOR(S) : Uzumaki et al.

It is certified that error appears in the above-identified patent and that said Letters Patent is hereby corrected as shown below:

<u>Title page,</u>
Item [75], Inventors, please delete "Hiroto Takeshita, Kawasaki, (JP); and Atsushi Tanaka, Kaweasaki, (JP). --.

Signed and Sealed this

First Day of November, 2005

JON W. DUDAS
*Director of the United States Patent and Trademark Office*